Patented Nov. 2, 1943

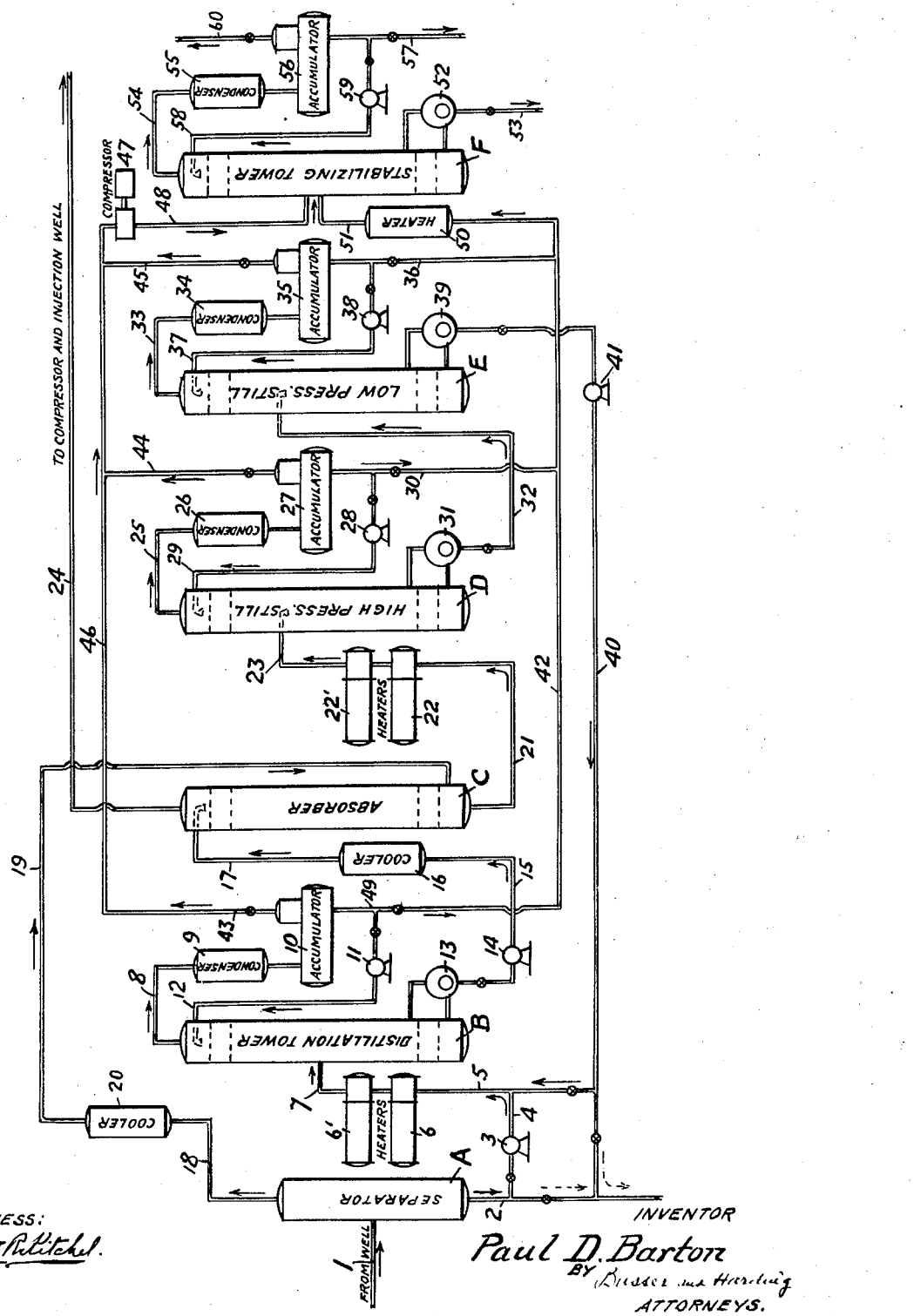

2,333,229

UNITED STATES PATENT OFFICE 2,333,229

PROCESS OF RECOVERING CONDENSABLE HYDROCARBONS FROM GAS:OIL WELL PRODUCTS

Paul D. Barton, Phoenixville, Pa., assignor to Sun Oil Company, Philadelphia, Pa., a corporation of New Jersey Application May 1, 1940, Serial No. 332,667

4 Claims. (Cl. 196—3)

The present invention relates to a method for recovering the largest possible portion of normally condensable hydrocarbons flowing from an oil or gas well which produces gas and oil at an extremely high ratio of gas to oil.

Since the search for oil has necessitated deeeper and deeper drilling operations, the sands encountered at greater depths are under high pressures. Certain new fields have become known as "distillate" fields, that is, the condensable material recovered from the high ratio gas:oil mixture flowing from the well has a minimum proportion of the heavier hydrocarbons such as wax, asphalt and high boiling hydrocarbons usually found existing with crude oil, the condensable material when distilled having an end point of 700° F. or lower. Some of these fields have tubing pressures at the well head of 2000 to 3000 pounds and in some cases even higher pressures are encountered. In producing such fields, since there is little market for the gas and since conservation measures require that gas shall not be wasted, the residue (overhead) gas, after the condensable liquid is separated therefrom, is recompressed and usually returned to a different section of the same sand from which it was withdrawn. It has been customary heretofore merely to pass the mixture of oil and gas from the well through a gas-oil separator that knocks down the liquid it is possible to recover and to then recompress the gas to a pressure somewhat above the pressure existing in the sand and return the gas to the sand through a well other than that from which it was withdrawn. It is also known to distil the thus knocked down liquid or stripped crude in a fractionator for removal of butane and lighter fractions and to treat these fractions, together with the gases removed from the gas-oil separator, and stabilize the contained condensable hydrocarbons.

In some cases, in order to procure larger recoveries of condensable liquid, the separated liquid or a portion thereof has been cooled and then injected into the separator or the line leading to the separator in an attempt to remove further quantities of liquid.

In my improved process, the liquid product (containing a portion of the normally condensable hydrocarbons) separated from the gas in the gas-oil separator is distilled to separate a comparatively high boiling product having a predetermined minimum boiling point, which is cooled and then flowed counter-current to the gases separated in the gas-oil separator to absorb from such gases the normally condensable hydrocarbons contained in said gases. Said product, containing said absorbed hydrocarbons, is distilled, at a locus different from that of the first distillation, to distil off absorbed hydrocarbons. The hydrocarbons distilled in both said distillation steps are stabilized to effect a substantially clean separation between normally condensable and normally incondensable hydrocarbons. The second distillation step preferably involves two successive distillations at respectively higher and lower pressures. Part of the liquid product from the second one-step or two-step distillation may be used together with the liquid product of the first distillation, as the absorbing medium for the gases separated in the gas-oil separator.

More specifically expressed, my improved process involves the following steps:

a. Separating as much liquid as possible from the gas in the usual gas-oil separator.

b. Distilling the liquid so separated to remove the lower boiling constituents therefrom.

c. Passing such liquid with the low boiling point constituents removed therefrom counter-current to the gas leaving the gas-oil separator in an absorber and then recompressing the gas after such absorption step and returning it to the sand from which it was originally withdrawn or to another sand.

d. Heating and fractionating the absorbent liquid from step c under high pressure to remove therefrom components absorbed therein from the gas in step c.

e. Subjecting such absorbent liquid to a further low pressure distillation process to recover absorbed components not separated in step d.

f. Subjecting the gaseous constituents separated in steps b, d and e to partial condensation and stabilizing the condensates together with the uncondensed gases.

g. Utilizing, if necessary, part of the liquid separated in step e to provide, together with the liquid separated in step a, sufficient heavy hydrocarbons for use as an absorption medium in step c.

A better understanding of the invention will be had by reference to the drawing which is a diagrammatic showing of a plant adapted to carry out the present process.

The mixture of oil and gas from the well (not shown) is admitted to a separator A by line 1, wherein as much liquid as possible is separated from the mixture. The liquid so separated passes out through line 2 and is passed by means of the pump 3 in line 4 to line 5 leading to a heater or heat exchangers 6, 6', whence it is passed in a heated condition through line 7 to a distillation column B. Tower B is carefully controlled to provide a bottom product whose initial boiling point is somewhat above the end boiling point of the larger portion of the gases separated from the liquid in the separator A. The material not condensed in tower B passes overhead through line 8 to a condenser 9 and thence to an accumulator and gas separator 10, whence a condensed portion is picked up by pump 11 and pumped through line 12 to the top of the tower B to act as a reflux medium, the balance of the condensables obtained in accumulator and gas separator 10 being drawn off and treated as will be hereinafter described. Tower B is preferably equipped with a re-boiler 13 which serves to vaporize any material condensed in the tower B boiling below a certain predetermined temperature. From the bottom of the re-boiler 13 the condensed liquid is withdrawn by means of pump 14 in line 15 and pumped to a cooler 16 and thence through line 17 to the top of absorption tower C. The gas separated in the separator A is then passed, through line 18, cooler 20 and line 19, to the bottom of absorption tower C and is passed upwardly therethrough in contact with the absorption medium distilled in the tower B, the pressure in tower C being the normal well pressure less, of course, the pressure drop through the apparatus and piping just described.

Within tower C low boiling hydrocarbons are absorbed by the liquid passing down through the tower, the mixture of these two being removed through line 21 to heaters 22, 22', wherein it is heated sufficiently to distil the absorbed material therefrom, the heated mixture passing from the heaters 22, 22' through line 23 to a high pressure still column D. The gas which is not absorbed in tower C passes overhead through line 24 to a compressor (not shown), wherein it is recompressed sufficiently to enable it to be passed back through a second well (not shown) to the sands from which it was withdrawn or to some other sand which is being re-pressured.

Within the tower D a large amount of the hydrocarbons absorbed in tower C are distilled from the absorption oil and pass overhead through line 25, the condensable portions thereof being condensed in condenser 26, the mixture of condensed and uncondensed material then being separated in the accumulator and gas separator 27. A portion of the condensed material is returned by pump 28 through line 29 back to the top of tower D to act as a reflux medium, the balance thereof being drawn off and further treated as will later be described. The high pressure still column D is preferably provided with a re-boiler 31 which serves to reheat the bottoms from the tower and drive off hydrocarbons above a pre-determined boiling point. The product from the re-boiler is drawn off through valved line 32 and passed to a low pressure still E, usually without further heating, wherein more light hydrocarbons are driven off from the absorption oil.

Tower E is provided with an overhead line 33, condenser 34 and accumulator and gas separator 35 which serve to condense a portion of the overhead product and separate the non-condensable portion therefrom, a portion of the condensable product being drawn off through lines 36 and 37 by means of pump 38 and returned to the top of low pressure still column E to serve as a reflux medium. Column E is also preferably equipped with a re-boiler 39 for removing lighter products which have been condensed within the tower E. From the bottom of re-boiler 39 a line 40 serves, together with pump 41, to withdraw the absorption liquid and any heavier material contained therein and not vaporized in towers D and E.

If the mixture of gas and oil from the well contains, after distillation in column B, sufficient heavier hydrocarbons for use as an absorption medium in tower C, the material drawn off from the re-boiler 39 through line 40 is cooled and passed to storage through the extension of line 2. Likewise if the material separated in the separator A is greater in quantity than is necessary for use as an absorption medium in C, a portion thereof may be drawn off through the extension of line 2 together with the material from the re-boiler 39. If, however, there is not sufficient heavy material contained in the original mixture of gas and oil from the well, a portion of the oil passing through line 40 may be diverted through the extension of line 5 and passed, with the bottoms from the separator A, through the heaters 6, 6' to the tower B.

While the liquid fractions contained in accumulators 10, 27 and 35 have been fractionated to some extent in the columns from which they were withdrawn as overhead vapor products, they will still contain, in an absorbed condition, a certain percentage of lighter hydrocarbons not condensable at normal temperatures.

Likewise the gases separated in these accumulators and gas separators will contain some condensable material. To stabilize these liquids and gases they are further treated in a distillation or stabilizing column F, the gases being drawn off through lines 43, 44 and 45 to a header 46 leading to a gas compressor 47 wherein the gases are recompressed to the pressure desired in column F and passed through line 48 to column F. The liquids contained in accumulators 10, 27 and 35 are withdrawn through lines 49, 30 and 36 respectively, pumps being provided in these lines if necessary, and passed to a header 42 leading to a heater or heat exchanger 50, wherein they are heated to a predetermined temperature and then passed through line 51 to column F. Column F serves to stabilize and further fractionate the mixtures of liquid and gases so that the bottom product drawn off from the usual re-boiler 52 through line 53 will not contain any hydrocarbons normally uncondensable at atmospheric temperatures.

Material not condensed in the tower F is passed overhead through line 54 to condenser 55 and an accumulator and gas separator 56. The gas passing overhead through line 60 from 56 may be used as fuel or recompressed and sent back to the well, together with the gas passing off through line 24. A portion of the condensed material in accumulator 56 withdrawn through line 57 is passed by means of pump 59 through line 58 to the top of tower F for use as a reflux medium.

What I claim and desire to protect by Letters Patent is:

1. A method for the recovery of normally condensable hydrocarbons from the gas-oil mixtures flowing from high pressure wells having a high gas:oil ratio, which comprises subjecting said mixture to a separating process in which liquid containing a portion of said normally condensable hydrocarbons is separated from gases containing the remaining normally condensable hydrocarbons, heating said liquid and distilling it to separate a comparatively high boiling bottom product, cooling the latter and flowing it counter-current to said gases to thereby absorb therefrom substantially the remaining normally condensable hydrocarbons, distilling at a locus other than that of the preceding distillation all the liquid containing said absorbed hydrocarbons to remove absorbed hydrocarbons therefrom, cooling the gaseous products distilled in said distillation steps to effect partial condensation thereof, compressing the uncondensed gases and subjecting said uncondensed gases containing some normally condensable hydrocarbons and the condensates resulting from the last named cooling containing some normally incondensable hydrocarbons to a stabilizing process effecting a substantially clean separation of normally condensable hydrocarbons.

2. A method for the recovery of normally condensable hydrocarbons from the gas-oil mixtures flowing from high pressure wells having a high gas:oil ratio, which comprises subjecting said mixture to a separating process in which liquid containing a portion of said normally condensable hydrocarbons is separated from gases containing the remaining normally condensable hydrocarbons, heating said separated liquid and distilling it to separate a comparatively high boiling bottom product, cooling the latter and flowing it counter-current to said gases to thereby absorb therefrom substantially the remaining normally condensable hydrocarbons, subjecting all the liquid containing said absorbed hydrocarbons to successive distillations at loci different from that of the first named distillation at respectively relatively high and low pressures and thereby removing from the last named liquid hydrocarbons absorbed therein, and cooling the gaseous distilled products to separate condensates containing some normally incondensable hydrocarbons from gases containing some normally condensable hydrocarbons, compressing said uncondensed gases and subjecting them and said condensates formed in said distillation step to a stabilizing process effecting separation of normally incondensable hydrocarbons.

3. A method for recovery of normally condensable hydrocarbons from gas-oil mixtures flowing from high pressure well having a high gas:oil ratio which comprises passing said mixture through a separating zone maintained at substantially well head pressure and therein separating liquid constituents from gas, removing said liquid constituents from said separating zone and flowing the same to a distillation zone, therein distilling off lower and intermediate boiling portions of said liquid constituents to produce higher boiling portions having a predetermined minimum boiling point and suitable for use as an absorption oil, removing said absorption oil from said distilling zone and flowing the same to an absorption zone, therein flowing said absorption oil countercurrent to the gas separated in said first mentioned separating zone to cause said absorption oil to absorb liquid constituents of said gas, removing the gas from said absorption zone, removing said absorption oil with said liquid constituents of said gas absorbed therein from said absorption zone to a high pressure distillation zone independent of the first distillation zone and therein distilling off the more volatile of said absorbed portions, removing the bottoms from said high pressure distillation zone to a low pressure distillation zone and therein distilling off intermediate boiling portions of said absorbed portion, removing the bottoms from said low pressure zone and passing at least a portion of the same to said first mentioned distillation zone.

4. A method for recovery of normally condensable hydrocarbons from gas-oil mixtures flowing from high pressure wells having a high gas:oil ratio which comprises passing said mixture through a separating zone maintained at substantially well head pressure and therein separating liquid constituents from gas, removing said liquid constituents from said separating zone and flowing the same to a distillation zone, therein distilling off lower and intermediate boiling portions of said liquid constituents to produce higher boiling portions having a predetermined minimum boiling point and suitable for use as an absorption oil, removing said absorption oil from said distilling zone and flowing the same to an absorption zone, therein flowing said absorption oil countercurrent to the gas separated in said first mentioned separating zone to cause said absorption oil to absorb liquid constituents of said gas, removing the gas from said absorption zone, removing said absorption oil with said liquid constituents of said gas absorbed therein from said absorption zone, flowing said absorption oil to a second distillation zone independent of the first distillation zone and therein distilling off low and intermediate boiling constituents, and returning at least a portion of the bottoms from the second distillation zone to the first distillation zone.

PAUL D. BARTON.